Aug. 29, 1939.   E. D. SLAWSON   2,171,050
CUTTING DEVICE FOR FISHERMEN
Filed Oct. 24, 1938
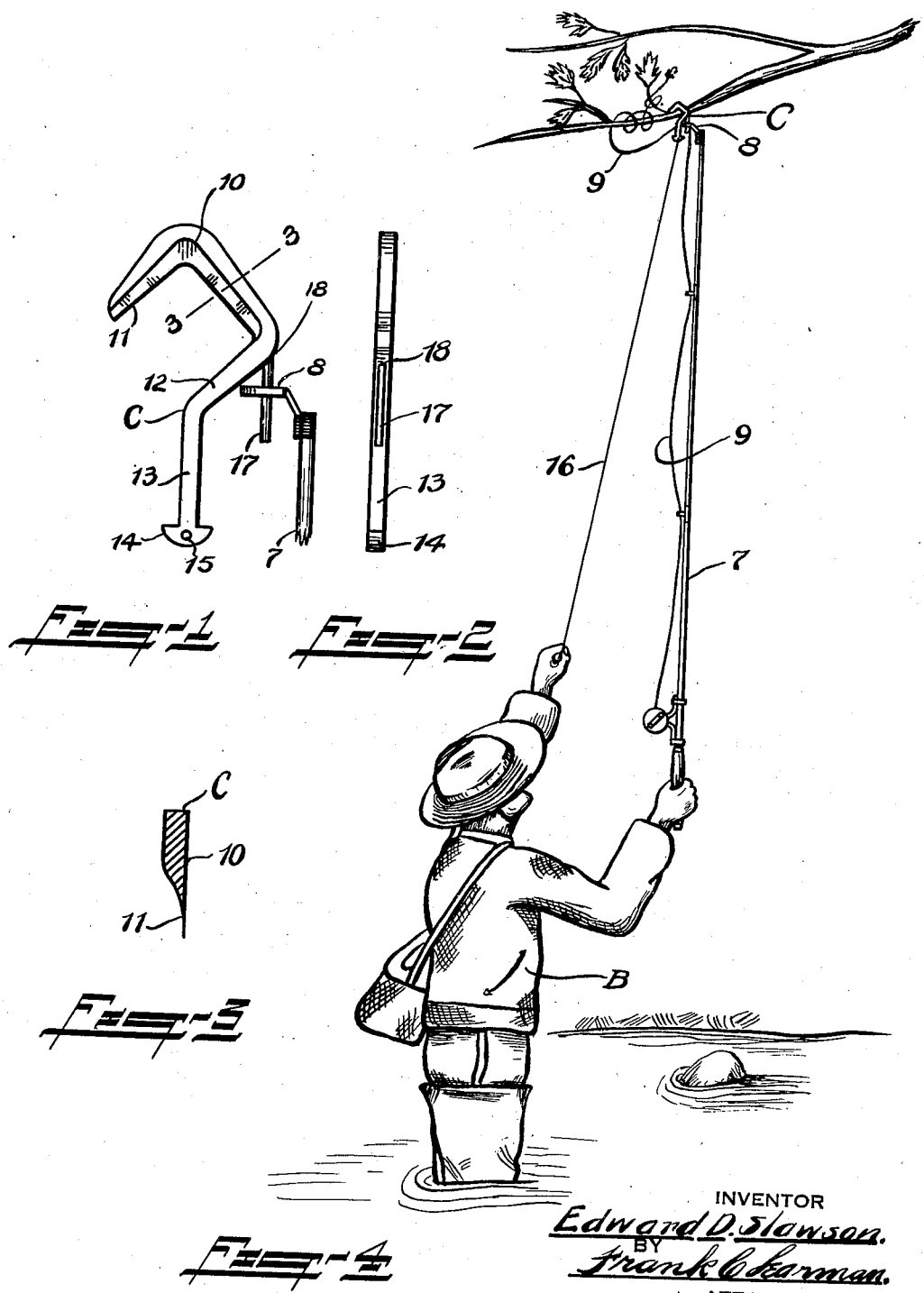
INVENTOR
Edward D. Slawson.
BY
Frank C. Chapman.
ATTORNEY Patented Aug. 29, 1939

2,171,050

UNITED STATES PATENT OFFICE 2,171,050

CUTTING DEVICE FOR FISHERMEN

Edward D. Slawson, Bay City, Mich., assignor to Leo D. Goddeyne, Bay City, Mich.

Application October 24, 1938, Serial No. 236,726

4 Claims. (Cl. 30—317)

This invention relates to cutting devices, and more particularly to a device for use by fishermen and which can be detachably mounted on a flyrod for cutting off a branch or twig on which the hook is snagged or the line entangled, which twig or branch is out of reach of the fisherman.

One of the prime objects of the invention is the provision of a very simple, practical and convenient device having a cord attached thereto, said device being so shaped that it can be fitted to the end of a flyrod or other pole and then hooked over branch or twig on which the line is snagged, after which the cord can be pulled to sever the twig or branch, allowing it to fall within reach of the fisherman, so that the line and hook may be removed without injury thereto or loss thereof.

Another object is to design a device provided with means for detachably engaging the eye or opening on a flyrod, so that it may be readily raised to enable it to be hooked over the branch or twig, and which is so shaped and balanced that it readily remains in position and cutting relation when pulled to cut the twig or branch.

A further object is to design a cutting device having sharp cutting edges so disposed with relation to each other that they readily sever the branches or twig to be cut.

With these and other objects in view, the present invention consists in the features of construction, combination and arrangement of parts as will be hereinafter more fully described in detail, illustrated in the accompanying drawing, which discloses the preferred embodiment of the invention, and pointed out in the claims hereunto appended.

In the drawing:

Fig. 1 is a side elevational view of the cutting device showing it mounted on the end of a flyrod.

Fig. 2 is an edge view of the device with the flyrod omitted.

Fig. 3 is an enlarged transverse sectional view taken on the line 3—3 of Fig. 1.

Fig. 4 is a view showing the device in use.

Usually the banks or shore lines of trout streams, creeks and small lakes are lined with heavy brush, trees and vegitation, the branches of which overhang the water, furnishing shade for trout and fish during certain periods on hot sunny days, and on trout streams in particular, it is general practise to wade the stream, casting so that the bait falls close to the shore line in holes, shady spots, and around stumps and other natural obstructions in the stream, and in so doing the line and/or hook often becomes entangled and/or snagged in overhanging branches which are out of the normal reach of the fisherman, but which can be reached with the flyrod.

Usually the effort to remove the hook or line causes it to break with the loss of hook, fly and leader, and I have therefore designed a cutting device which can be fitted to the upper end of the rod, so that said rod can be utilized for hooking this device over the twig or branch on which the line or hook is snagged, and which has a cord attached thereto to enable the fisherman to exert a pull which severs the twig after which the line, fly, and hook can then be untangled and removed.

Referring now to the drawing in which I have shown the preferred embodiment of my invention, and more particularly to Fig. 4 in which B shows a fisherman having a flyrod 7 provided with an eye 8 at its upper end and through which the line 9 is threaded. This illustration shows the line entangled on a branch with my cutting device C mounted on the end of the flyrod and hooked over the branch on which the line is entangled.

The cutting member C comprises a triangular shaped section 10, the inner edges of which are sharpened to form cutting edges 11, as shown, thence the frame is bent inwardly as at 12, and thence downwardly, terminating in a centrally disposed shank 13, the end 14 of which is flatted, and a hole 15 is drilled therein, and to which a cord 16 is connected, this shank being substantially in vertical alignment with the apex of the triangular shaped cutting edges 11 so that the device is properly balanced, a depending pin 17 being welded or otherwise secured to the heel 18 of the device and is of a size to be accommodated in the eye 8 of the flyrod.

In the present instance I have shown the cutting device formed of a single piece, the cutting edges being integral therewith, but it will be understood that the cutting edges may be formed of separate pieces, such as safety razor blades (not shown) which can be welded or riveted in position without departing from the spirit of the invention.

The device is small and compact, it can be carried in a box or in the coat pocket and is used as follows:

If the line 9 on the flyrod becomes snagged or entangled on a branch or twig, the fisherman inserts the pin 17 of the cutting device in the eye 8 of the flyrod. The rod is then raised so that the cutting member C can be hooked over the branch, and as clearly shown in Fig. 4 of the drawing, the fisherman then exerts a downward pull on the cord 16 which severs the branch, after which the device is removed and placed in a box or in the coat pocket.

The device is evenly balanced, the main body of the device overhangs and protects the sharp cutting edges, and the relation of these cutting edges to each other tends to shear the branch or twig and with a minimum of force or pull.

From the foregoing description, it will be obvious that I have perfected a very simple, practical and conventional cutting tool for use by fishermen in general.

What I claim is:

1. A cutting device adapted to be detachably mounted on a support, and comprising an angularly shaped cutting section, the end of said section being reversely bent and terminating in a centrally disposed shank depending therefrom and disposed in vertical alignment with the apex of the cutting section a cord anchored to said shank, and means on device for detachable engagement with the line guide of a flyrod to permit the device to be placed over the twig to be cut.

2. A cutting device adapted to be loosely and releasably mounted on a flyrod and comprising a triangular shaped frame, the inner edge having sharpened cutting surfaces, a centrally disposed offset depending shank portion formed integral with said frame, and having an opening adjacent the end thereof, a cord anchored to said opening, and a pin on said device for detachable engagement with the line guide of the flyrod.

3. A cutting device adapted to be loosely mounted in the line guide, a flyrod and including a triangular shaped section, the inner edges having sharpened cutting surfaces, an offset centrally disposed shank formed integral therewith with the main body of the shank disposed substantially in vertical alignment with the apex of the triangular shaped member, a cord attached to said shank, and a depending pin provided on the device for detachable engagement with the line guide of a flyrod.

4. A cutting device of the class described comprising an angularly shaped frame, the inner edge of which is provided with sharpened cutting edges, one end of said frame being bent inwardly and thence downwardly to form an elongated balancing shank, a cord anchored to said shank, and a pin projecting from said frame for insertion in the line guide of a flyrod.

EDWARD D. SLAWSON.